US010095495B2

(12) United States Patent
Leonelli et al.

(10) Patent No.: US 10,095,495 B2
(45) Date of Patent: Oct. 9, 2018

(54) METHOD AND APPARATUS FOR AUTOMATIC SOFTWARE DEVELOPMENT FOR A GROUP OF CONTROLLER-BASED DEVICES

(71) Applicant: Ciambella Ltd., Tortola (VG)

(72) Inventors: Jean-Baptiste Leonelli, Levallois (FR); Trisala Chandaria, New York, NY (US)

(73) Assignee: Ciambella Ltd., Tortola (VG)

( * ) Notice: Subject to any disclaimer, the term of this patent is extended or adjusted under 35 U.S.C. 154(b) by 4 days.

(21) Appl. No.: 15/148,353

(22) Filed: May 6, 2016

(65) Prior Publication Data

US 2016/0328216 A1  Nov. 10, 2016

Related U.S. Application Data

(60) Provisional application No. 62/158,636, filed on May 8, 2015.

(51) Int. Cl.
| | | |
|---|---|---|
| *G06F 9/44* | (2018.01) | |
| *G06F 9/445* | (2018.01) | |
| *G06F 8/41* | (2018.01) | |
| *G06F 8/34* | (2018.01) | |
| *G06F 8/61* | (2018.01) | |
| *G06F 9/54* | (2006.01) | |

(52) U.S. Cl.
CPC .............. *G06F 8/447* (2013.01); *G06F 8/34* (2013.01); *G06F 8/41* (2013.01); *G06F 8/64* (2013.01); *G06F 9/54* (2013.01)

(58) Field of Classification Search
None
See application file for complete search history.

(56) References Cited

U.S. PATENT DOCUMENTS

| | | | |
|---|---|---|---|
| 5,623,604 | A | 4/1997 | Russell et al. |
| 5,852,733 | A | 12/1998 | Chien et al. |
| 5,887,172 | A | 3/1999 | Vasudevan et al. |

(Continued)

FOREIGN PATENT DOCUMENTS

| | | |
|---|---|---|
| EP | 2498178 A1 | 9/2012 |
| JP | 2016112651 A | 6/2016 |

(Continued)

OTHER PUBLICATIONS

Marshall, "Remote Procedure Calls (RPC)", Jan. 5, 1999, pp. 1-14.

(Continued)

*Primary Examiner* — Lewis A Bullock, Jr.
*Assistant Examiner* — Mark A Gooray
(74) *Attorney, Agent, or Firm* — Moser Taboada (57) ABSTRACT

A method and apparatus for automatic generation of software for controller-based devices in a group is provided. The method comprises receiving, for a controller-based device from a plurality of controller-based devices displayed on a graphical user interface (GUI) on a user device, a selection of a controller type, a communication protocol to be used for communicating with another controller-based device in a group of controller-based devices, the group comprising the plurality of controller-based devices, and a function to be performed based on a remote call from the controller-based device.

20 Claims, 7 Drawing Sheets

(56) References Cited

U.S. PATENT DOCUMENTS

| | | | |
|---|---|---|---|
| 6,065,053 A | 5/2000 | Nouri et al. | |
| 6,108,715 A | 8/2000 | Leach et al. | |
| 6,158,031 A | 12/2000 | Mack et al. | |
| 6,266,809 B1 | 7/2001 | Craig et al. | |
| 6,324,681 B1 | 11/2001 | Sebesta et al. | |
| 6,366,300 B1 | 4/2002 | Ohara et al. | |
| 6,401,156 B1 | 6/2002 | Mergard et al. | |
| 6,490,723 B1 | 12/2002 | Bearden et al. | |
| 6,715,132 B1 | 3/2004 | Bartz et al. | |
| 6,895,573 B2 | 5/2005 | Norgaard et al. | |
| 6,931,288 B1 | 8/2005 | Lee et al. | |
| 6,966,039 B1 | 11/2005 | Bartz et al. | |
| 7,010,773 B1 | 3/2006 | Bartz et al. | |
| 7,043,715 B1 | 5/2006 | Bauer et al. | |
| 7,086,014 B1 | 8/2006 | Bartz et al. | |
| 7,127,705 B2 | 10/2006 | Christfort et al. | |
| 7,143,360 B1 | 11/2006 | Ogami et al. | |
| 7,246,319 B2 | 7/2007 | Alden et al. | |
| 7,784,030 B2 | 8/2010 | Christfort et al. | |
| 8,028,258 B1 | 9/2011 | Ogami et al. | |
| 8,086,744 B2 | 12/2011 | Abdullah et al. | |
| 8,352,903 B1 | 1/2013 | Friedman | |
| 8,508,367 B2* | 8/2013 | Shafer | G06K 7/0008 235/385 |
| 8,694,954 B2 | 4/2014 | Ortiz | |
| 8,752,033 B2 | 6/2014 | Mohammed et al. | |
| 8,990,787 B2 | 3/2015 | Balassanian | |
| 9,148,413 B1 | 9/2015 | Marr et al. | |
| 2002/0078168 A1 | 6/2002 | Christfort et al. | |
| 2002/0169850 A1 | 11/2002 | Batke et al. | |
| 2002/0194313 A1 | 12/2002 | Brannock | |
| 2003/0023839 A1 | 1/2003 | Burkhardt et al. | |
| 2003/0037181 A1 | 2/2003 | Freed | |
| 2003/0120707 A1 | 6/2003 | Bogdan et al. | |
| 2003/0177208 A1 | 9/2003 | Harvey, IV | |
| 2004/0010734 A1* | 1/2004 | Ghercioiu | G06F 8/61 714/38.13 |
| 2004/0034842 A1 | 2/2004 | Mantey et al. | |
| 2004/0040028 A1 | 2/2004 | Moreau | |
| 2004/0249944 A1 | 12/2004 | Hosking et al. | |
| 2004/0267926 A1 | 12/2004 | Rothman et al. | |
| 2005/0114644 A1 | 5/2005 | Chu et al. | |
| 2005/0114854 A1 | 5/2005 | Padisetty et al. | |
| 2005/0177269 A1 | 8/2005 | Funk | |
| 2005/0198624 A1 | 9/2005 | Chipman | |
| 2005/0283786 A1 | 12/2005 | Dettinger et al. | |
| 2006/0020910 A1 | 1/2006 | Schlanger et al. | |
| 2006/0041644 A1 | 2/2006 | Henseler | |
| 2006/0041854 A1 | 2/2006 | Schlanger et al. | |
| 2006/0059447 A1 | 3/2006 | Ariyama et al. | |
| 2006/0122730 A1 | 6/2006 | Niemela et al. | |
| 2006/0259588 A1 | 11/2006 | Lerman et al. | |
| 2006/0277158 A1 | 12/2006 | Kim | |
| 2006/0277328 A1 | 12/2006 | Cherian et al. | |
| 2007/0142929 A1 | 6/2007 | Pereira | |
| 2007/0174037 A1 | 7/2007 | Ling | |
| 2007/0186246 A1 | 8/2007 | Goldhor | |
| 2007/0234341 A1 | 10/2007 | Chang et al. | |
| 2007/0250800 A1 | 10/2007 | Keswick | |
| 2007/0283072 A1 | 12/2007 | Johnson | |
| 2008/0021994 A1 | 1/2008 | Grelewicz et al. | |
| 2008/0040093 A1 | 2/2008 | Sargaison et al. | |
| 2008/0082603 A1 | 4/2008 | Mansour et al. | |
| 2008/0092073 A1 | 4/2008 | Shih et al. | |
| 2008/0109782 A1 | 5/2008 | Adelman et al. | |
| 2008/0163269 A1 | 7/2008 | Goto | |
| 2008/0222715 A1 | 9/2008 | Bansal et al. | |
| 2009/0095807 A1 | 4/2009 | Dickerson et al. | |
| 2009/0171484 A1 | 7/2009 | Birze et al. | |
| 2009/0198770 A1 | 8/2009 | Jiang | |
| 2010/0010908 A1 | 1/2010 | Pasupulati et al. | |
| 2010/0205273 A1 | 8/2010 | Shim | |
| 2010/0271989 A1 | 10/2010 | Chernoguzov et al. | |
| 2010/0287571 A1 | 11/2010 | Mohammed et al. | |
| 2010/0299187 A1 | 11/2010 | Duggal | |
| 2011/0154305 A1 | 6/2011 | Leroux et al. | |
| 2011/0179347 A1 | 7/2011 | Proctor et al. | |
| 2011/0238969 A1 | 9/2011 | Warkentin et al. | |
| 2011/0246891 A1 | 10/2011 | Schubert et al. | |
| 2011/0271269 A1 | 11/2011 | Tazzari et al. | |
| 2011/0295391 A1 | 12/2011 | Schneider et al. | |
| 2012/0022674 A1 | 1/2012 | Choo | |
| 2012/0036493 A1 | 2/2012 | Moosmann et al. | |
| 2012/0233588 A1 | 9/2012 | Mruthyunjaya et al. | |
| 2012/0233589 A1 | 9/2012 | Mruthyunjaya et al. | |
| 2012/0233612 A1 | 9/2012 | Beckett | |
| 2013/0125089 A1 | 5/2013 | Mohammed et al. | |
| 2013/0125107 A1 | 5/2013 | Bandakka et al. | |
| 2013/0201316 A1 | 8/2013 | Binder et al. | |
| 2013/0271659 A1 | 10/2013 | Na et al. | |
| 2013/0275560 A1 | 10/2013 | Bestmann et al. | |
| 2014/0040182 A1 | 2/2014 | Gilder et al. | |
| 2014/0109057 A1 | 4/2014 | Gibbens et al. | |
| 2014/0123124 A1 | 5/2014 | Gray et al. | |
| 2014/0215433 A1 | 7/2014 | Bergamaschi et al. | |
| 2014/0258986 A1 | 9/2014 | Wang et al. | |
| 2014/0372963 A1 | 12/2014 | Chandaria et al. | |
| 2014/0372975 A1 | 12/2014 | Chandaria et al. | |
| 2015/0045960 A1 | 2/2015 | Caron et al. | |
| 2015/0046902 A1 | 2/2015 | Kumar et al. | |
| 2015/0127192 A1 | 5/2015 | Phatak et al. | |
| 2016/0012026 A1 | 1/2016 | Baikov et al. | |

FOREIGN PATENT DOCUMENTS

| | | |
|---|---|---|
| KR | 20080044576 A | 5/2008 |
| WO | WO-2005050503 A1 | 6/2005 |

OTHER PUBLICATIONS

Benso et al., "A Software Development Kit for Dependable Applications in Embedded Systems", Conference: Proceedings IEEE International Test Conference, 2000.

Alonso et al., "Computer Networks Exercise 4", ETH, 2006, pp. 1-6.

Battaglia et al., "An Open and Portable Software Development Kit for Handheld Devices with Proprietary Operating Systems", IEEE Transactions on Consumer Electronics, vol. 55, Issue 4, Nov. 2009, pp. 2436-2444.

Krzyzanowski, "Remote Procedure Calls", Oct. 30, 2012.

Bergen, "RPC Automation: Making Legacy Code Relevant", 8th International Symposium on Software Engineering for Adaptive and Self-Managing Systems (SEAMS), 2013, pp. 175-180.

Kasai, "Embedded Middleware and Software Development Kit for Area-Based Distributed Mobile Cache System", IEEE Transactions on Consumer Electronics, vol. 59, Issue 1, Feb. 2013, pp. 281-289.

International Search Report and Written Opinion dated Oct. 30, 2014 for PCT Application No. PCT/US2014/046215.

International Search Report and Written Opinion dated Oct. 31, 2014 for PCT Application No. PCT/US2014/042783.

International Search Report and Written Opinion dated Oct. 31, 2014 for PCT Application No. PCT/US2014/042774.

International Search Report and Written Opinion dated Nov. 3, 2014 for PCT Application No. PCT/US2014/042780.

International Search Report and Written Opinion dated Apr. 22, 2015 for PCT Application No. PCT/US2015/010562.

International Search Report and Written Opinion dated Aug. 11, 2016 for PCT Application No. PCT/US2016/031217.

International Search Report and written Opinion dated Oct. 4, 2016 for PCT Application No. PCT/US2016/041573.

Feipeng Liu, "Android Native development Kit Cookbook", Mar. 1, 2013, XP055326992, ISBN: 978-1-84969-150-5, pp. 1-331.

International Search Report and written Opinion dated Apr. 13, 2017 for PCT Application No. PCT/US2016/067944, 14 pgs.

International Search Report and Written Opinion dated Nov. 24, 2017 for PCT Application No. PCT/US2017/047964.

Extended European Search Report dated Oct. 23, 2017 for Application No. 15735508.2.

(56) References Cited

OTHER PUBLICATIONS

International Search Report and Written Opinion dated Nov. 15, 2017 for PCT Application No. PCT/US2017/047944.

* cited by examiner

METHOD AND APPARATUS FOR AUTOMATIC SOFTWARE DEVELOPMENT FOR A GROUP OF CONTROLLER-BASED DEVICES

CROSS-REFERENCE TO RELATED APPLICATIONS

This application claims priority to U.S. Provisional Patent Application No. 62/158,636, filed May 8, 2015, which is incorporated by reference herein in its entirety.

BACKGROUND OF THE INVENTION

Field of the Invention

Embodiments of the present invention generally relate to a method and apparatus for automatic software development for a group of controller-based devices.

Description of the Related Art

The use of field programmable gate arrays (FPGAs) and other controller-based devices (e.g. microcontroller or microprocessor based), such as MCU, SoC, mobile phones, computers, etc. have grown considerably popular. Low manufacturing costs, availability, and customization of controllers have led to a proliferation of microcontrollers and Systems on a Chip (SoC) (e.g., PIC, ARDUINO, RASPBERRY PI and the like) being used by commercial companies and hobbyists alike for creation of devices. Controller-based devices include a processor core and a memory, which are programmable for processing input/output data in communication with peripherals. Program memory in the form of NOR FLASH or OTP ROM is also often included on such controller-based devices, as well as a small amount of random access memory (RAM). Several such controller-based devices are designed for embedded applications within larger devices. Real world applications of such controller-based devices can potentially include connecting controller-based devices with conventional objects or systems as peripherals, thereby enabling digitization, connectivity and even remote control of such peripherals. However, several challenges exist in making such real world applications due to the complexity of combining Cloud technologies with hardware and software technologies In general, programming controller-based devices or groups thereof is quite complex. As the "Internet of Things (IoT)" grows, more and more such controller-based devices are connected to one another and/or to the Internet, significantly increasing the complexity of programming. In real-world scenarios, such controller-based devices may communicate with one another and/or to a gateway such that the gateway becomes a proxy for the Internet communications for the so-called edge devices. Edge devices may communicate through one or more gateways, or directly as independent devices. Within a group, all the devices (gateway and edge) must be programmed in a compatible manner to facilitate interoperability, which further increases the complexity of programming such devices significantly. Further, managing compatibility every time a customization is implemented may also be excessively time consuming. Programming groups of controller-based devices is very challenging for users as one has to memorize coding commands, understand hierarchies, utilize proper calling syntaxes, and the like. Even if one device is programmed incorrectly, a written program for that or another controller-based device in the group may fail to run, or produce errors.

Thus, there is a need in the art for simplifying programming for controller-based devices, while automatically doing so for a group of controller-based devices.

SUMMARY OF THE INVENTION

Embodiments of the present invention generally relate to a method and apparatus for automatic software development for a group of controller-based devices, substantially as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention relate to method and apparatus for automatic software development for a group of controller-based devices (e.g., devices having a controller, such as microcontrollers, microprocessors, SoC, MCU, among others) which function as edge or gateway devices that operate interactively, and more specifically, to generating programs or code for execution on edge and gateway devices forming a group of interconnected controller-based devices comprising at least one edge device and at least one gateway device. The code for the controller-based devices includes code for execution on the controller-based devices (a "first code") comprising a remote call for executing a function (by executing a "second code") on a device remote to the controller-based devices, for example, a code virtualization server. The first code refers to a complete program for execution on the controller-based device, or to a code snippet, which may be included in a preexisting program for the controller-based device. The first code also comprises a software development kit (SDK) for the controller-based devices. The SDK comprises a library that enables communication between various controller-based devices (edge and gateway devices) in the group, and between the gateway and the code virtualization server, to route a remote call from any controller-based device in the group to the code virtualization server. The second code includes one or more predefined processes or programs on the code virtualization server for performing the functions invoked by the remote call.

In some embodiments, the code virtualization server also generates the first code automatically based on inputs related to the controller-based device. The inputs are selections made via a graphical user interface (GUI) on a user device remote to the code virtualization server. Selections made via the GUI include a controller-based device of the group, controller type of the controller-based device, communication protocol to be used by the controller-based device to communicate with another controller-based device in the group, and a function to be performed based on the remote call received from the controller-based device. Upon generation, the first code is installed on the controller-based device either directly by the code virtualization server, or via the user device. The first code installed on each device of the group enables interconnectivity between various devices of the group, thereby enabling routing a remote call originating from any device in the group to the code virtualization server, via a gateway device. Therefore, in the course of executing the first code, a controller-based device places a remote call for performing a remote function along with input and/or output data for the function, the remote call and the input/output data is routed via a gateway of the group to the code virtualization server. In response, the code virtualization server executes the second code according to the input/output data to perform the function. In this manner, software (the first code comprising the SDK) is generated automatically for each device in a group of interconnected controller-based, by providing inputs conveniently using a GUI. The software is generated for the entire group without having to deal with the complexity of programming each controller-based device, or configuring the programs for each controller-based device individually according to the interconnections of edge and gateway devices in the group of controller-based devices.

Commonly assigned patent application Ser. No. 11/853, 137, filed 11 Sep. 2007, Ser. No. 11/853,143, filed 11 Sep. 2007, and Ser. No. 12/931,292, filed 28 Jan. 2011 (now U.S. Pat. No. 8,726,285) describe techniques for generating, deploying and executing workflows remotely. Commonly assigned patent application Ser. No. 14/307,198, filed 17 Jun. 2014, Ser. No. 14/307,208, filed 17 Jun. 2014, Ser. No. 14/307,227, filed 17 Jun. 2014, Ser. No. 14/328,415, filed 10 Jul. 2014, Ser. No. 14/593,151, filed 9 Jan. 2015, and Ser. No. 14/685,064, filed 13 Apr. 2015, describe techniques for automatic generation of code and SDK, virtualization of code and SDK, generating remote process calls for code virtualization, among other related techniques. The listed applications describe techniques for developing software automatically for a controller-based device incorporating a controller, mapping the use of hardware such as sensors or actuators to the controller remotely using a graphical user interface, and executing the software, e.g. remotely, to extend the capabilities of such a controller-based device via defined workflows. Each of the applications listed above is incorporated herein by reference in its entirety. These techniques function by placing a snippet of code and/or a library (e.g. a SDK) in the memory of the controller-based device, wherein the snippet, when executed, calls a function (or a portion of code) for being executed on a remote device, for example, a code virtualization server, and/or sends (directly, or via the code virtualization server) data to a remote service which is remote to the code virtualization server, and/or further calls a function to be performed on the data by the remote service.

Embodiments of the present invention use these techniques to generate, automatically, programs for several controller-based devices in a group, which includes edge and gateway devices, and the edge devices communicate outside the group via the gateway devices. With such embodiments, code is generated automatically for some or all devices in the group, which extends the functionality of the group, enables plug and play of additional devices, while maintaining the compatibility and interoperability of the devices in the group.

Figure 1:
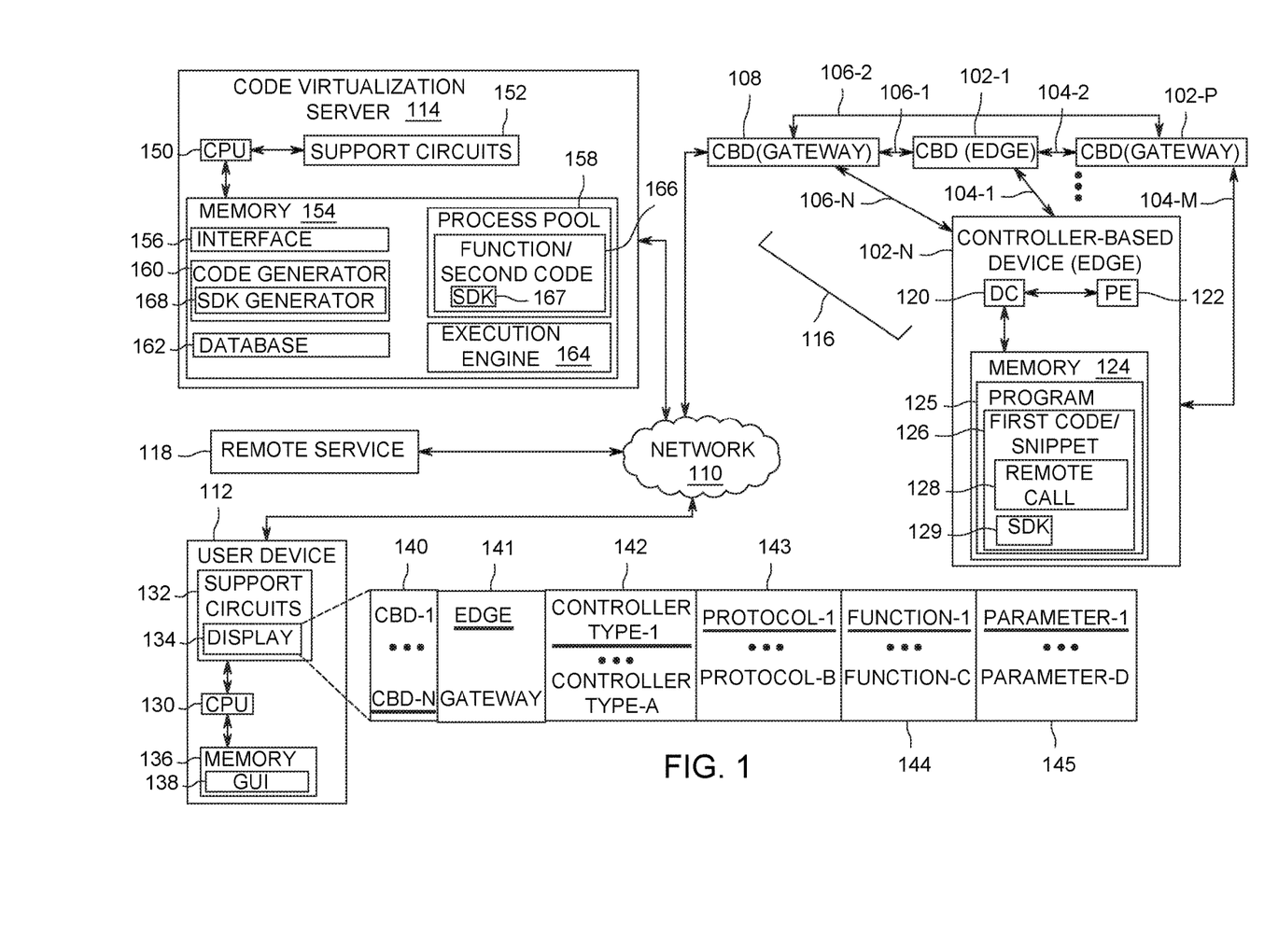
FIG. 1 is a block diagram of a system 100 for automatic software development for a group of controller-based devices, in accordance with an embodiment of the present invention.

FIG. 1 is a block diagram of a system 100 for automatic software development for a group of controller-based devices, in accordance with one or more embodiments of the present invention. The system 100 comprises multiple edge devices 102-1 . . . 102-N (collectively referred to as edge devices 102), a gateway device or a gateway 108, a network 110, a user computer 112, a code virtualization server 114, and a remote service 118. In some embodiments the edge devices 102 include a gateway device 102-P configured as an edge device.

The network 110 comprises the Internet, or a wide area network (WAN) or a combination thereof, and may include one or more such networks, spanning the various devices as illustrated in FIG. 1. All the components of the apparatus 100 are connected to the network 110 or to each other as illustrated in FIG. 1, using known methods and components.

The edge devices 102 and the gateway 108 form a group of controller-based devices (device group 116, or group 116) connected to the Internet 110. The devices of the group 116 communicate between edge devices 102 and the gateway 108 along communications paths 106-1 . . . 106-N. Although the communications paths are generally wireless paths, in some embodiments, the paths may be wired. In addition, in some embodiments, the controller-based devices 102 communicate amongst themselves along dashed paths 104-1 . . . 104-M, collectively referred to as 104, which includes one-to-one, one-to-many, many-to-many (e.g. a mesh network) connectivity configurations, or any combination thereof. Edge devices 102 communicate outside the group 116 through the gateway 108. Although a single gateway 108 is depicted, multiple gateways similar to the gateway 108 may be used within the group 116, or spanning multiple groups similar to the group 116.

Each of the edge devices 102 and the gateway 108 includes a device controller (DC) 120, peripheral electronics (PE) 122, and a memory 124. Edge devices are controller-based devices that do not communicate with devices outside the group 116, whereas gateway devices 108 are devices that communicate with devices outside the group 116, for example the code virtualization server 114, the user device 112, and the remote service 118. For example, and for the sake of brevity, only the edge device (or controller-based device) 102-N is shown to include the device controller 120, peripheral electronics 122 and a memory 124, although each controller-based device (edge devices 102 and the gateway 108) includes a device controller and a memory, and may include peripheral electronics, for example, in a manner similar to the edge device 102-N. The device controller 120 includes one or more of a microcontroller (e.g., PIC, AVR type, ARM type, and the like), a system on chip (SoC, e.g., RASPBERRY PI), or a microprocessor as generally known in the art. The type of controller may differ from device to device, for example, based on the application of such device and the functionality required.

The peripheral electronics 122 include, but are not limited to, sensors, lights, audio microphones, speakers, actuators, displays, printers, scanners, I/O devices, and any other devices that may be manipulated using a digital signal from the digital controller 120. The peripheral electronics 122 comprise components to manage or operate a conventional system, or the peripheral electronics 122 are themselves a conventional system, such as a music system, an alarm, household appliances, electrical devices, electro-mechanical devices, among several others.

The memory 124 is any form of digital storage used for storing data and executable software. Such memory includes, but is not limited to, random access memory, read only memory, disk storage, optical storage, and the like. The memory 124 stores computer readable instructions corresponding to an operating system (not shown), and a first code, which is a program 125 or a code snippet 126 within the program 125. The first code (referred to as 126 for simplicity, but will be understood to mean either the program 125 or the snippet 126) further includes a remote call 128 to a function on a device remote to the controller-based device 102-N, for example, the code virtualization server 114. The first code 126 further includes additional code components, such as an SDK 129 comprising library(ies) necessary for executing the first code 126 and the remote call 128 on the edge device 102-N. The SDK 129 ensures that the edge device 102-N can communicate to the code virtualization server 114 via the gateway 108, or to other edge devices 102. Similarly, SDK for a gateway enables communications from the gateway to the code virtualization server 114, to edge devices 102, or to other gateway devices (not shown).

The user device 112 is a computer, such as a personal computer (PC), a laptop, a tablet, a smartphone, and the like, and the user device 112 comprises a CPU 130, support circuits 132 and a memory 136. The CPU 130 may be any commercially available processor, microprocessor, microcontroller, and the like. The support circuits 132 comprise well-known circuits that provide functionality to the CPU such as a user interface, clock circuits, network communications, cache, power supplies, I/O circuits, and the like. The I/O circuits include a display 134, for example, various standard or touch-based displays, such as computer monitors as generally known in the art. In some embodiments, the user interface comprises a keypad, electronic buttons, speaker, touchscreen, display, or other user interaction mechanism. The memory 136 is any form of digital storage used for storing data and executable software. Such memory includes, but is not limited to, random access memory, read only memory, disk storage, optical storage, and the like. The memory 136 stores computer readable instructions corresponding to an operating system (not shown), and a graphical user interface (GUI) 138, which is displayed on the display 134. The GUI 138 is installed on the user device 112, or a rendered via the browser 138 on the user device 112. In some embodiments, the GUI is resident on the code virtualization server, but is rendered on the user device 112 via the browser 138 on the user device 112.

The GUI 138 presents selectable lists for a given controller-based device in the group, and associated inputs, such as, mode of operation (edge or gateway), controller type(s), communication protocol(s) and function(s), which are presented on the display 134 for a user to make corresponding selections. In some embodiments, the user may manipulate the GUI 138 using the user interface of the user device 112, to load a list 140 of controller-based devices (edge devices 102, gateway 108) of the group 116. The user may also specify, for example, using a check box or a radio button (not shown), if a gateway is being used in the group 116. The user selects CBD-N corresponding to the controller-based device 102-N, as indicated by the solid underline. For the selected device CBD-N, the GUI 138 loads lists associated inputs, for example, list 141 of device type (edge or gateway) of CBD-N, list 142 of the controller type(s), list 143 of the communication protocol(s), and list 144 of the function(s) available to CBD-N or various devices of the group 116. In some embodiments, a list 145 of parameters comprising input forms is also presented for the user to input at least one parameter for performing a function, for example, the function selected in the list 144. Further, the user may provide inputs corresponding to lists 141-145 with respect to multiple controller-based devices, for example, selecting a different device in the list 140 after inputs corresponding one have been provided. In some embodiments, predefined lists corresponding to the one or more inputs associated with the controller-based device are available at the user device 112, or are created at the user device 112 by detecting controller-based devices connected to the user device 112. In some embodiments, the predefined lists are retrieved from the code virtualization server 114.

The lists are displayed by the GUI 138 as the lists 140-145, and user selects or provides input corresponding to each list as indicated by the underlining in the lists 140-145. For example, for the CBD-N selected in the list 140, EDGE is selected in the list 141, CONTROLLER TYPE-1 is selected in the list 142, PROTOCOL-1 is selected in the list 143, FUNCTION-1 is selected in the list 144, and PARAMETER-1 is provided or selected in the list 145. Controller types include, without limitation, PIC, AVR, ARM, and the like. Communication protocols are machine-to-machine communication protocols, including without limitation, MQTT, CoAP, HTTP, HTTPS, and the like. Functions are functions available for being performed on the code virtualization server 114 for controller-based devices in the group 116, for example, sending an email, a text message, invoking other internally (privately) hosted services, such as an internal data source (e.g., DB, noSQL DB, files and the like), or Internet based services, for example, social networks, such as TWITTER or FACEBOOK, online shopping portals, such as AMAZON, VoIP providers, such as SKYPE, search engines, such as GOOGLE, DUCKDUCKGO, a voice call, a video call, among several others known in the art. Parameters are input attributes for achieving the desired behaviour of the function, for example, the email service to use, the email account, and the like. The selections and/or inputs may be stored locally in the memory 136 of the user device 112, or sent to the code virtualization server 114 directly. In this manner, the selection inputs made via the GUI 138 are provided to the code virtualization server 114. Examples of controller types, communication protocols and parameters are included in TABLE 1. In some embodiments, parameters discussed in Table 1 may be used additionally to generate the first code in a manner similar to that of the described embodiments, and selection of such parameters may be obtained as an input via the GUI 138, or may be obtained from a predefined data stored on the code virtualization server 114.

TABLE 1

| Type | Parameter | Example/Comments |
|---|---|---|
| General | Profile name | Name of a set of parameters (includes all sub-profiles) |
| Hardware Profile | Hardware type | Arduino Uno, Arduino Yun, Texas Instruments CC3200, Raspberry PI, etc. |
| Hardware Profile | Processor type | AVR, ARM, PIC, etc. |
| Hardware Profile | Network Hardware | Arduino Wifi Shield, Built-in Ethernet, Ethernet Shield, BLE Shield, Built-in BLE |
| Credential Profile | Username | Username for a web service like FACEBOOK, AMAZON . . . |
| Credential Profile | Password | Password for a web service like FACEBOOK, AMAZON . . . |
| Credential Profile | API Key | Developer API key given by web services like FACEBOOK, AMAZON, . . . There can be several API keys |
| Credential Profile | API Secret | Developer API secret given by web services like FACEBOOK, AMAZON, . . . There can be several API secrets |
| Connection Profile | Connection Profile name | Allows to select different Connection profiles |
| Connection Profile | Type | Wifi, Bluetooth, Zigbee, Z-WAVE, THREAD, LORA, 6LOWPAN, . . . |
| Connection Profile | Security Type | WPA, WEP, unsecured, . . . |
| Connection Profile | SSID | Wifi network identifier |
| Connection Profile | Password | Network password |
| Connection Profile | Transport Protocol | MQTT, CoAP, HTTP/S, TCP/IP . . . |
| Connection Profile | Role | Gateway or Edge |
| Setup Profile | Output Pin | Indicates which Output Pin is selected on the processor (multiple Output Pins can be selected) |
| Setup Profile | Input Pin | Indicates which Input Pin is selected on the processor (multiple Input Pins can be selected) |
| Setup Profile | Pin Rule | Specifies what rule is applied to a given Pin (Input or Output). For example: If Temperature = 19 then write High to Pin 12 |
| Input Profile | Required Input Parameter | Also called variable. Can be any parameter a choreo needs to be executed. Can be multiple Input Parameters. For example, a choreo sending an email will need Input Parameters like: Email address, Subject, Body, Attachment, . . . |
| Input Profile | Optional Input Parameter | Optional Input parameters are used to add Parameters that are not necessary. Multiple Optional Input Parameters are possible. For example, a choreo sending an email has optional Input Parameters like: CC, BCC or encryption type |

The GUI 138 described above illustrates one possible GUI scheme for receiving various selections and communicating such selections to the code virtualization server 114, and the techniques described herein are not limited to the specific illustration of the GUI 138. For example, the lists may be presented simultaneously on the same screen, or sequentially, or a combination, among several other GUI schemes that will occur readily without departing from the scope or spirit of the invention defined by the claims. For example, FIGS. 4-7 illustrate an alternative GUI scheme, according to embodiments of the invention. In alternative embodiments, the GUI 138 may use algorithms on a custom Application Specific Integrated Circuit (ASIC) to provide the functionality provided by the combination of the CPU 130, the support circuits 132 and the memory 136 as described with respect to the user device 112. In some embodiments, the I/O devices include a keypad, electronic buttons, speaker, touchscreen, display, or other user interaction mechanism.

The user device 112 is coupled to the network 110 when selecting a controller-based device (edge or gateway devices) for software generation thereof, and selecting other inputs such as controller type, functions, communication protocols, parameters for executing the function, and when receiving the developed software, for example, the first code 126. The user device 112 is also connected to the controller-based (edge and gateway) devices in the device group 116 either directly, or via the network 110, when installing the first code on respective controller-based devices. In some embodiments, the user device 112 includes an integrated development environment or IDE (not shown), to insert snippets of code into preexisting programs on the controller-based devices, or to install complete programs on the controller-based device.

The code virtualization server 114 may be a general-purpose computer or other electronic processing device that is programmed to perform functions related to embodiments of the present invention. The code virtualization server 114 comprises a CPU 150, support circuits 152, and a memory 154 containing instructions and algorithms. The CPU 150 may be any commercially available processor, microprocessor, microcontroller, and the like. The support circuits 152 comprise well-known circuits that provide functionality to the CPU such as a user interface, clock circuits, network communications, cache, power supplies, I/O circuits, and the like. Alternative embodiments may use control algorithms on a custom Application Specific Integrated Circuit (ASIC) to provide the functionality provided by the any combination of the CPU 150, the support circuits 152 and the memory 154. In some embodiments, the user interface comprises a keypad, electronic buttons, speaker, touchscreen, display, or other user interaction mechanism.

The memory 154 may be any form of digital storage used for storing data and executable software. Such memory includes, but is not limited to, random access memory, read only memory, disk storage, optical storage, and the like. The memory 154 stores computer readable instructions corresponding to an operating system (not shown), an interface 156, a process pool 158, a code generator 160, a database 162, and an execution engine 164.

The interface 156 provides functionality for the user device 112 to interact with the code virtualization server 114. In some embodiments, the interface 156 may also include GUI software, for example, corresponding to the GUI 138, which may be sent by the code virtualization server 114 to the user device 112, or otherwise provided for installation on the user device 112. In some embodiments, the interface 156 includes software to render the GUI 138 through a browser on the user device 112. In addition, the interface 156 provides connectivity to the controller-based devices 102, 108 of the group 116, and to the remote service 118.

The process pool 158 comprises code corresponding to functions to be performed in response to a remote call received from the controller-based devices of the group 116. The functions are also referred to as "choreographs" or "choreos", and the corresponding code that is executed to perform the functions is referred to as second code 166. Hereinafter, the terms "function", "choreographs", "choreos", will also be referred to as the "second code" 166, and the terms will be used interchangeably, unless otherwise apparent from the context. In some embodiments, the functions interact with external services, for example, a remote service 118. The second code 166 also includes software development kit (SDK) 167 to support execution of the second code 166, and the SDK 167 may include SDK components of the remote service 118 if the functions are required to interact with the remote service 118. The process pool 158 further comprises a list of functions corresponding to each function made available for selection by the GUI 138, for example, as described above, and includes the second code corresponding to the listed functions. According to some embodiments, the list of functions is sent to the GUI 138 for display, and selection of a function by a user of the user device 112.

The code generator 160 generates the first code 126 for the controller-based device 102-N, and embeds code corresponding to the call 128 in the first code 126. The code generator 160 further includes an SDK generator 168 to generate the SDK 129 included in the first code 126, to support the execution of the first code 126 on the controller-based device 102-N. The first code 126 is generated automatically for the controller-based device 102-N, based on its configuration or device type (EDGE), the controller type (CONTROLLER-1) of the digital controller 120, the communication protocol (PROTOCOL-1) used for communicating with other controller-based device(s) in the group 116, and the function (FUNCTION-1) to be performed in response to the remote call 128. For example, the code generator 160 incorporates, in the first code 126, the appropriate identifier or address for the second code 166 in the remote call 128, in order to invoke the FUNCTION-1 based on the remote call. The code generator 160 further incorporates appropriate communication protocol in the first code 126 to route the remote call 128 from the CBD 102-N to the gateway device 108, and then to the code virtualization server 114. The code generator 160 further generates the code 126 suitable to the controller type of the CBD 102-N. In some embodiments, the code generator 160 further incorporates parameter data (PARAMETER-1) in the first code 126 in order to perform the remote function according to the PARAMETER-1. The SDK 129 supports execution of the first code 126, for example, by providing necessary code libraries according to the hardware, software platform, communication infrastructure (including communication protocols, connection types, and the like), and other code execution parameters.

The database 162 includes user data such user names, identification information and passwords for authenticating the user device 112 or the remote service 118 to the code virtualization server 114, to achieve a secure environment. In some embodiments, the database 162 also includes authentication information to authenticate the controller-based devices (102, 108) to the code virtualization server 114. According to various embodiments, the database 162 further includes, without limitation, one or more of a list of controller-based devices in the group 116, controller type(s) for each controller-based device in the group 116, communication protocol(s) used by each controller-based device of the group 116, and preexisting parameters for performing the function, that is, executing the first code. The interface 158 may use data from the database 162 may be used to populate one or more lists of the GUI 138.

The execution engine 164 supports the foregoing functions of the components on the code virtualization server 114. In response to receiving the remote call 128 from the controller-based device 102-N, the execution engine 164 executes the second code 166 (corresponding to the requested function) using the appropriate parameters (e.g., stored in the database, or received as input from the GUI 138) for the second code 166. In some embodiments, the execution engine 164 sends data generated from the execution of the second code 166 to the controller-based device 102-N via the gateway 108. In some embodiments, the functions or the second code 166 interacts with the remote service 118, and the execution engine 164 facilitates exchange of data between the remote service 118 and the second code 166. Embodiments of the invention enable controller-based devices (CBD 102-N) of the group 116 to place a remote call for execution of the second code 166 on the code virtualization server 114 to perform functions that the device controller 120 of the controller-based device 102-N would otherwise not be able to perform, greatly enhancing the capability of the devices in the group 116.

The remote service 118 includes private or public services provided by third party servers or databases (i.e., devices) that are remote to the user device 112, the code virtualization server 114, and the controller-based devices (102, 108). For example, the remote service 118 includes third party databases and services (e.g., AMAZON, EBAY, FACEBOOK, APPLE PUSH NOTIFICATION servers, text message servers, email servers, and the like), or an internal data source (e.g., DB, noSQL DB, files and the like). The remote service 118 is accessible to the code virtualization server 114 via the network 110 or another network. According to some embodiments, the remote service 118 is provisioned upon execution of the second code 166 using associated parameters, in response to receiving the remote call 128 from the controller-based device 102-N of the group 116.

Figure 2:
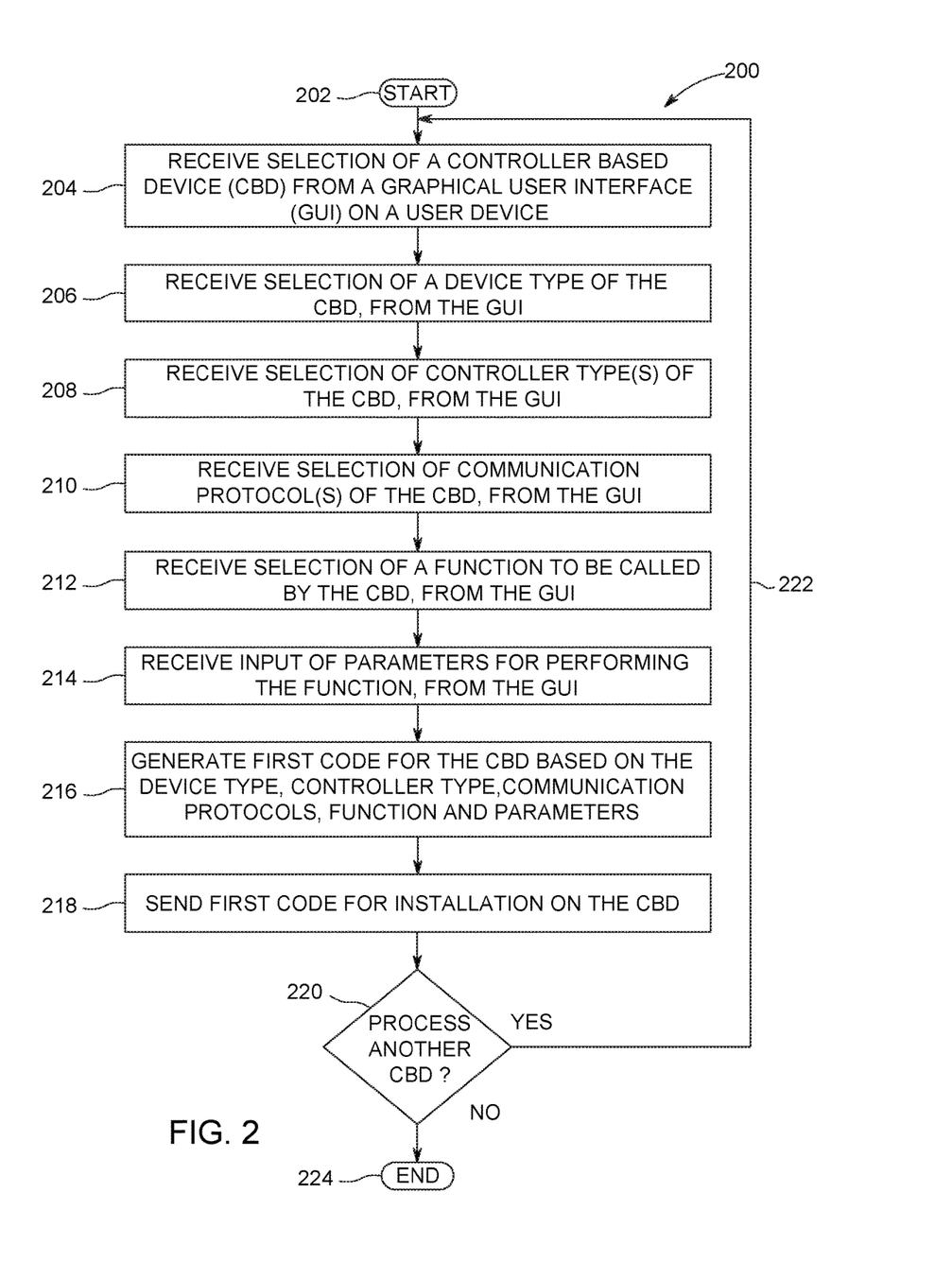
FIG. 2 is flow diagram of a method for automatic software development for a group of controller-based devices as executed by the code virtualization server of FIG. 1, in accordance with an embodiment of the invention.

FIG. 2 depicts a flow diagram of a method 200 executed by the code virtualization server 114 to program the group 116 of controller-based devices in accordance with embodiments of the present invention. The method 200 is for programming a group of devices in which a gateway device is used, for example, as may indicated via the GUI 138, or as shown via a GUI screen 400 of FIG. 4. The method 200 begins at step 202 and proceeds to step 204, at which the method 200 receives a selection of a controller-based device from the GUI 138. In one embodiment, selection is made by clicking on CBD-N (indicated by solid underline, FIG. 1) on the list 140, where CBD-N corresponds to the device 102-N of the group 116. In another embodiment, selection is made on a GUI screen 500 of FIG. 5, by selecting or adding a controller-based device 502 (gateway) and/or 504 (edge).

The method 200 proceeds to step 206. At step 206, the method 200 receives from the GUI 138, an input specifying the device type of the controller-based device selected at step 204 (e.g. 102-N). Device type includes edge device or gateway device. In one embodiment, the selection is made by clicking on "EDGE" (solid underline, list 141 of FIG. 1). In some embodiments, the device type may be specified when selecting the controller-based device, for example, as shown in selection or addition of the controller-based devices 502, 504 via a GUI screen 500 of FIG. 5.

Figure 5:
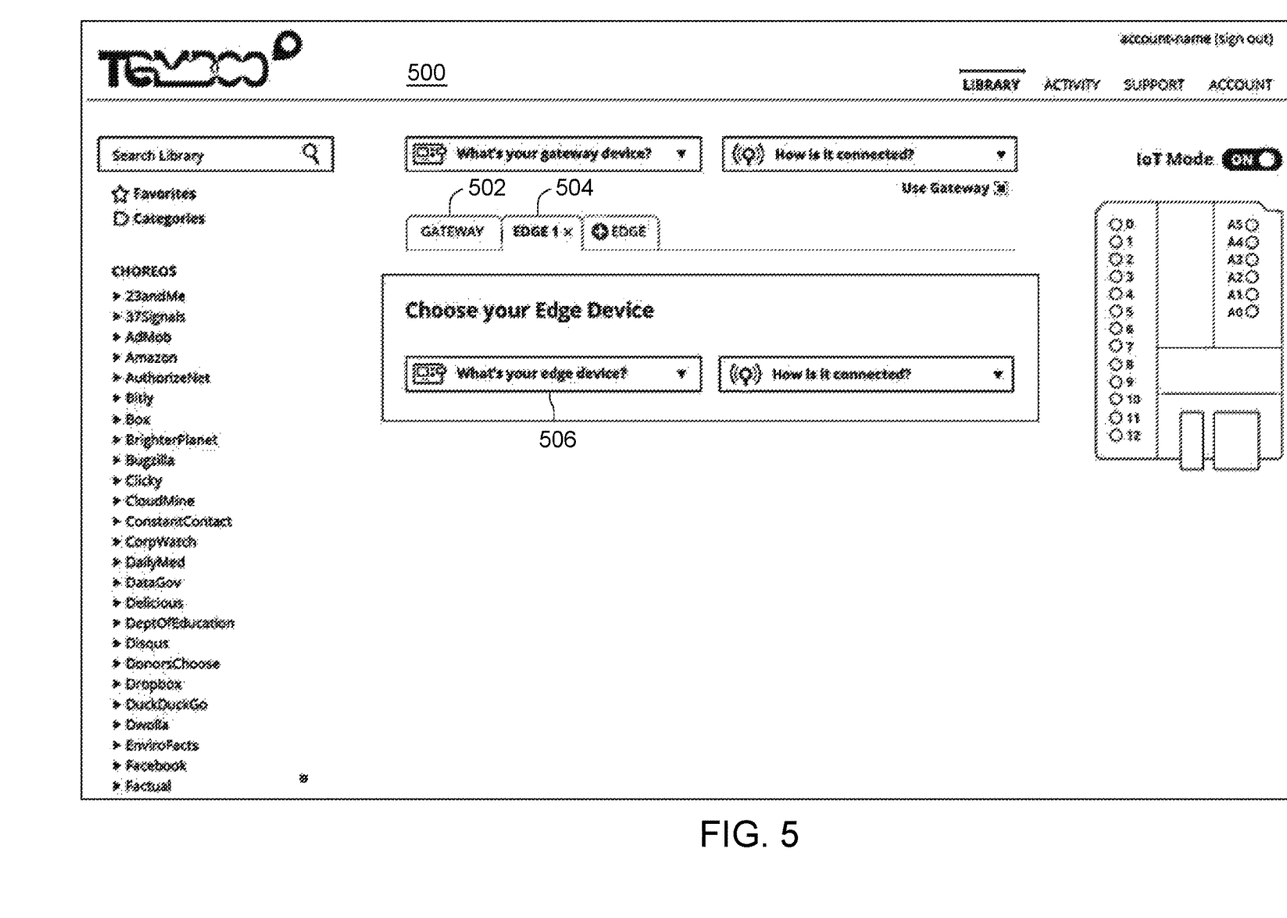
Figure 6:
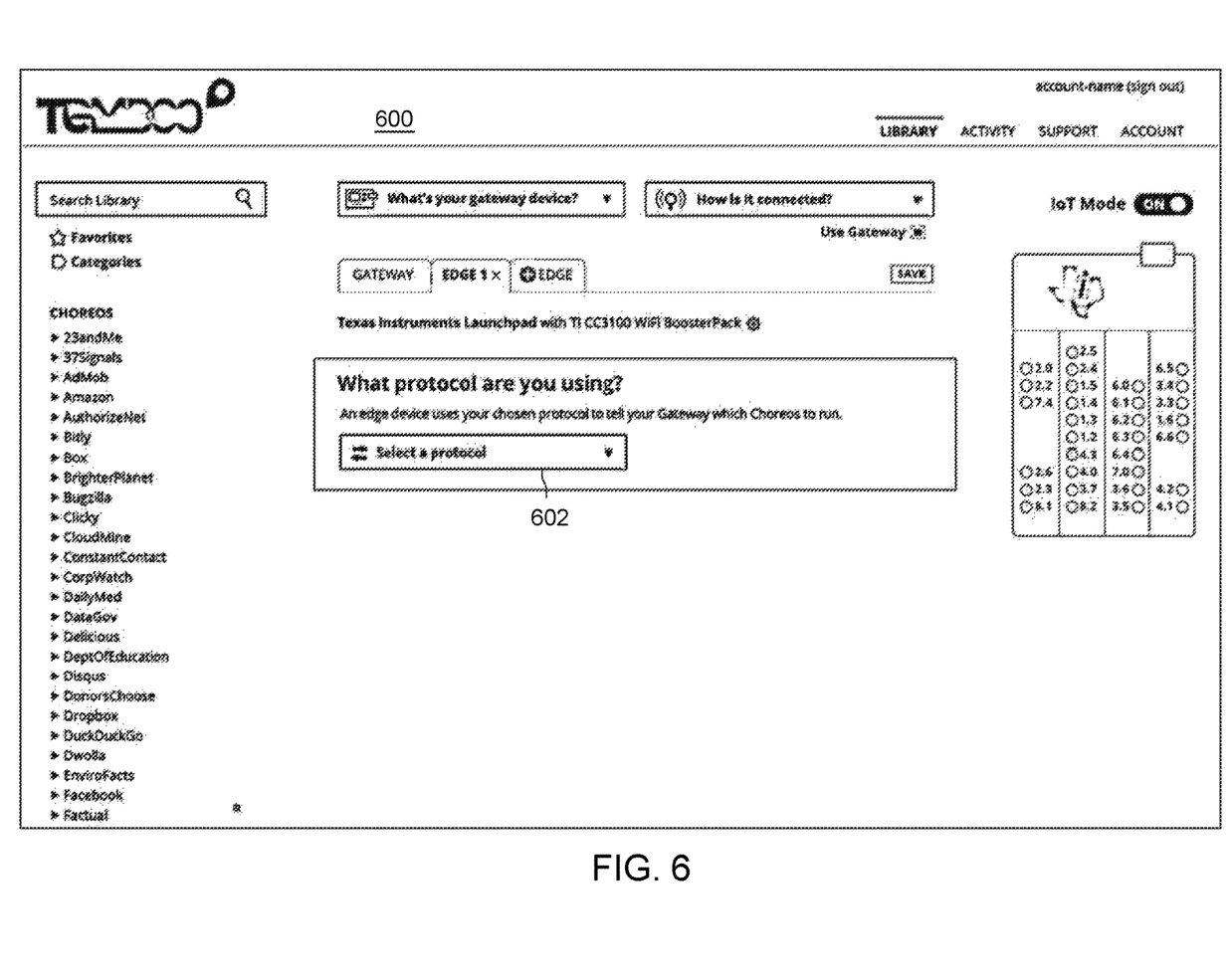
Figure 7:
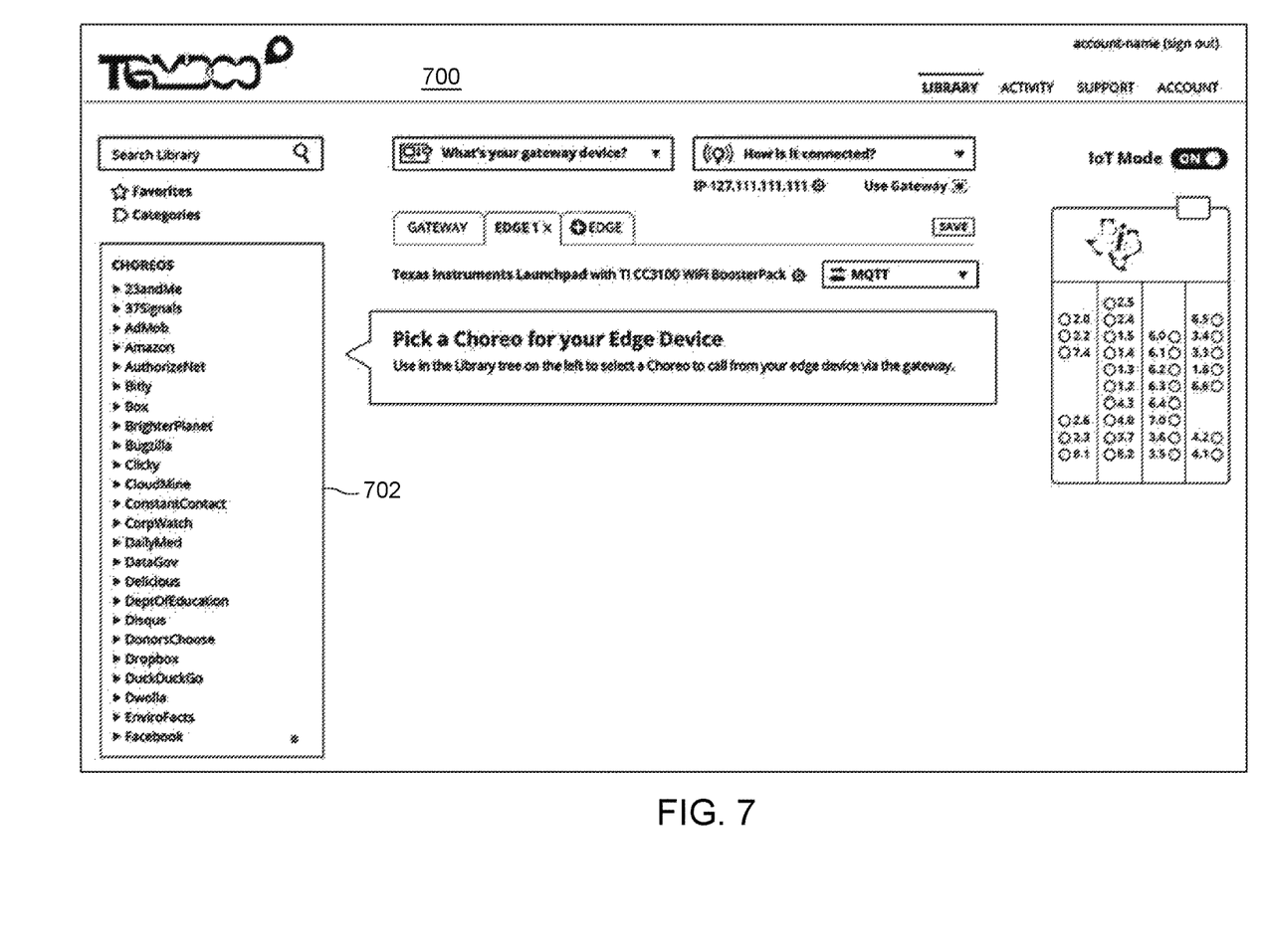

The method 200 proceeds to step 208, at which the method 200 receives from the GUI 138, an input specifying the controller type of the device controller 120 of the selected controller-based device (e.g. 102-N). Controller types include, without limitation, at least one of a microcontroller or a microprocessor, for example, AVR, ARM, PIC, among several similar other controller types, as generally known in the art. In some embodiments, the controller type is selected by selecting an option from the list 142 of FIG. 1. In some embodiments, the controller type is selected by specifying the device details, for example, using a drop down list 506 of the GUI screen 500.

The method 200 proceeds to step 210, at which the method 200 receives from the GUI 138, an input specifying a communication protocol for the selected device (102-N). Typically, the communication protocol is a machine-to-machine (M-to-M) communication protocol, which includes, without limitation, HTTP, HTTPS, TCP/IP, MQTT, CoAP, LoRa, ZigBee, Thread, Z-WAVE, Bluetooth, 6LOWPAN, or other known communication protocols. In some embodiments, the communication protocol is selected from the list 143 of FIG. 1. In some embodiments, the communication protocol is specified by selecting an appropriate option from the drop down list 602 in GUI screen 600 of FIG. 6.

The method 200 proceeds to step 212, at which the method 200 receives from the GUI 138, an input specifying a function (or a choreo) to be called by the selected device (102-N). In some embodiments, the function is selected from the list 144 of FIG. 1. In some embodiments, the function is specified by selecting an appropriate option from menu 702 listing choreos in GUI screen 700 of FIG. 7.

The method 200 proceeds to optional step 214, at which the method 200 receives from the GUI 138, an input specifying parameters needed for performing the selected function. The parameters define how the function will operate when called from the device (102-N). In some embodiments, the parameters are specified using the list 145 of FIG. 1. In some embodiments, the parameters are specified using a form on a GUI screen, for example, similar to the GUI screens depicted in FIGS. 4-7.

In steps 204-214, the inputs are received from the GUI 138 sequentially or simultaneously. Further, the GUI 138 receives inputs from a user manipulating the input/output devices of the user device 112 to select or input appropriate responses, for example, as depicted by solid underline in the lists 140-145 of FIG. 1, or the GUI screens of FIGS. 4-7. Without limitation, other GUI schemes may also be used for implementing the method 200, without departing from the scope and spirit of the embodiments described herein, as defined by the claims.

The method proceeds to step 216, at which the method 200 generates a first code, for example, the first code 126 comprising a remote call (the remote call 128) to the function, and an SDK based on the input received from steps 206-214. For example, the first code 126 is generated for the controller-based device 102-N based on the device type (EDGE), the controller type (CONTROLLER-1) of the digital controller 120, the communication protocol (PROTOCOL-1) used for communicating with other controller-based device(s) in the group 116, the function (FUNCTION-1) to be performed in response to the remote call 128, and the parameter (PARAMETER-1). The first code 126 includes an entire program for the device 102-N, or a snippet for inserting into a preexisting program on the device 102-N, and includes the information on the controller type, the communication protocol, and the function to be performed by the remote call. Specifically, the first code 126 is configured to route the remote call 128 from the device 102-N, via the gateway 108, to the code virtualization server 114 for executing the function (or the second code 166). If provided at optional step 214, the first code 126 also includes parameters required for operating the function.

The method 200 proceeds to step 218, at which the method 200 sends the first code 126 for installation on the controller-based device 102-N. In some embodiments, the first code 126 is sent to the controller-based device 102-N via the gateway 108. In some embodiments, the first code 126 is sent to the user device 112, which installs the first code to the controller-based device 102-N directly, or via the gateway 108. For example, the GUI 138 on the user device may be used to insert the first code 126 as a code snippet in a preexisting program on the controller-based device 102-N.

At step 220, the method 200 queries whether another device is to be processed. If the query is answered affirmatively (option "YES"), the method 200 proceeds along path 222 to step 204 where a selection corresponding to a new controller-based device is received from the GUI 138, for example, based on a user selection from the list 140. If at step 218, the query is answered negatively (option "NO"), for example, when the first code for a desired number of devices of the group 116 has been generated, the method 200 proceeds to step 224, at which the method 200 ends.

Figure 4:
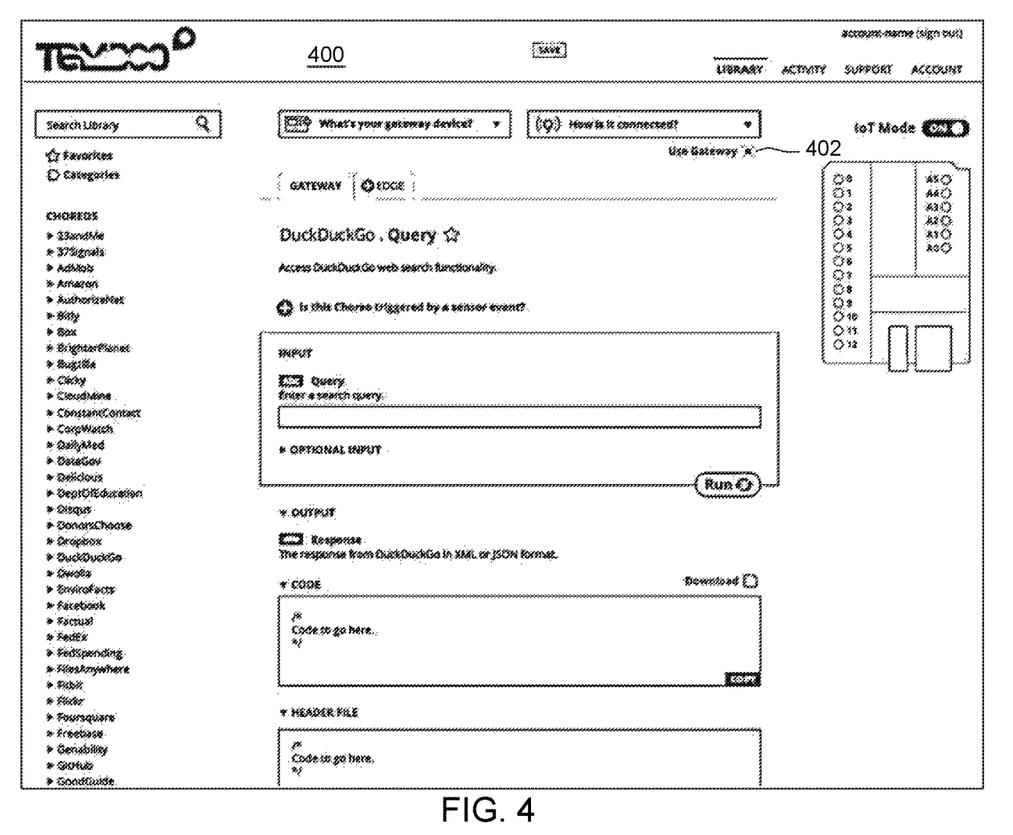
FIGS. 4-7 depict a sequence of graphical user interface (GUI) screens of the GUI 138 of FIG. 1, used to specify controller-based devices and associated inputs, in accordance with an embodiment of the invention.

The method 200 may be repeated for several or all controller-based devices of the group 116, including edge devices 102 and the gateway 108. Embodiments of the invention pertain to generating programs for device groups in which at least one gateway device is used, for example, the device group 116. If a gateway device is not used, for example, if the checkbox 402 of the GUI screen 400 is not selected, techniques for program generation for a single device via a single device GUI may be used, for example, as described in commonly assigned U.S. patent application Ser. No. 14/207,208, filed 17 Jun. 2014 and herein incorporated by reference in its entirety.

Figure 3:
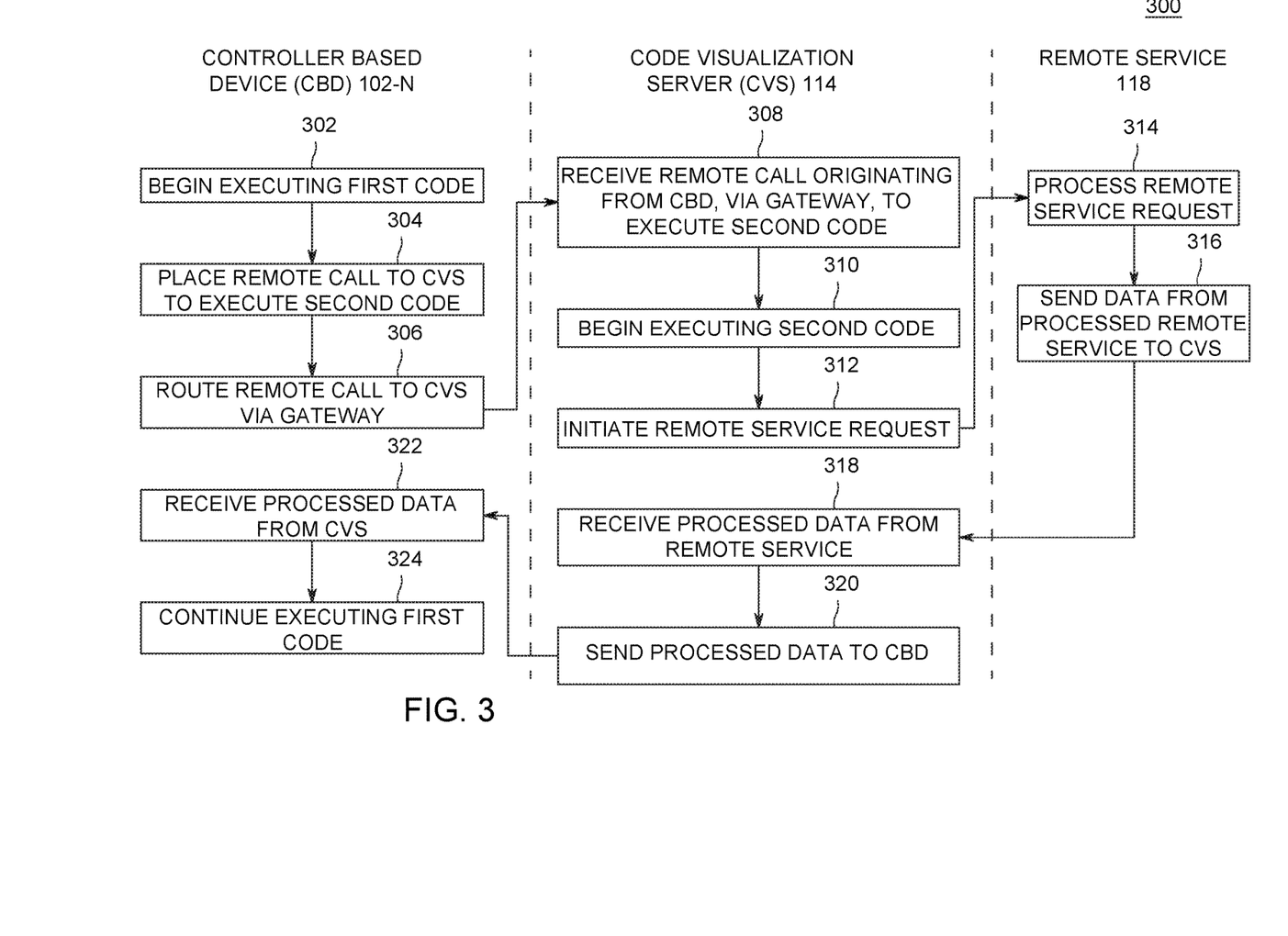
FIG. 3 is a flow diagram of a method 300 executed by various devices of the apparatus 100 of FIG. 1, for automatic software development for a group of controller-based devices, in accordance with an embodiment of the invention.

FIG. 3 depicts a flow diagram of a method 300 executed by various devices of the apparatus 100 of FIG. 1, illustrating the programmed device 102-N in operation, for example, programmed according to the method 200 of FIG. 2. The method 300 is executed by the controller-based device 102-N, the code virtualization server 114, and the remote service 118.

The method 300 begins at step 302, at which the method 300 begins executing the first code on the controller-based device 102-N. At step 304, the method 300 places a remote call to the code virtualization server 114 to execute the second code. At step 306, the method 300 routes the remote call through a gateway device, for example, the gateway 108 in the group 116, to the code virtualization server 114. According to embodiments of the invention, the first code (including the SDK) include connection protocols to enable the remote call to be routed from the controller-based device 102-N to the gateway 108 directly, or through another controller-based device(s) in the group 116, and the gateway 108 communicates the remote call to the code virtualization server 114.

The method 300 proceeds to step 308, at which the execution of the method 300 shifts to the code virtualization server 114 and, at step 308, the method 300 receives the remote call originating from the controller-based device 102-N, via the gateway 108, to execute the second code 166 to perform the desired function. For example, the function is the function selected using the GUI 138 from the list 144.

At step 310, the method 300 begins executing the second code to perform the function. In some embodiments, the second code is executed using parameters for the function, for example, as discussed above. In some embodiments, performing the function includes performing a service request to a remote service, for example, the remote service 118, and the second code includes functionality to process a request to the remote service 118, for example, using APIs and other available functionalities.

At step 312, the method 300 initiates a remote service request from the code virtualization server 114 to the remote service 118. Execution of the method 300 shifts to the remote service 118 at step 314, at which the method 300 processes the remote service request and, at optional step 316, the method 300 sends data, if generated, by the remote service 118 to the code virtualization server 114. In some embodiments, the data generated from the processing of the remote service 118 includes a confirmation that the request for the remote service 118 has been processed. In other embodiments, additional data may be generated by the remote service 118.

Execution of the method 300 shifts to the code virtualization server 114 at optional step 318, at which the method 300 receives the data from the remote service 118. At optional step 320, the method 300 sends the received data to the controller-based device 102-N. In some embodiments (not shown), the data received from the remote service 118 is sent to the user device 112 for display via the GUI at optional step 320. Execution of the method 300 shifts to the controller-based device 102-N at optional step 322, at which the method 300 receives, from the code virtualization server 114, the processed data from the remote service 118. At optional step 324, the method 300 continues executing the first code on the controller-based device. In some embodiments, even though the remote service 118 is performed at step 314, no data is generated by the remote service 118, and in such embodiments, the method 300 ends at step 314. In some embodiments, at optional step 316, the method 300 sends a data indicating that the remote service 118 has been processed, to the controller-based device 102-N, via the code virtualization server 114 (e.g. via optional steps 318, 320) and the gateway 108, or only via the gateway 108. The method 300 receives this data at optional step 322 and continues execution of the first code at optional step 324. In some embodiments, the controller-based device 102-N continues execution of the first code without waiting for data from the remote service 118. In some embodiments, execution of the first code at the controller-based device 102-N concludes after routing the remote call to the code virtualizations server 114 at step 306.

In this manner, the functionality of the controller-based device is significantly extended by programming the device 102-N and the group 116 according to the embodiments described herein.

For example, an environmental monitoring system within a computer center may include multiple temperature sensors, each sensor being coupled to a device controller (together, an edge device) that gathers and transmits sensor data to an aggregating device (functioning as a gateway), via a wireless transceiver using a communication protocol compatible with the aggregating device. The communication protocols may vary across the edge devices. The gateway device aggregates and/or pre-processes the data received from different edge devices, and transmits the data via the Internet to a monitoring service. According to embodiments of the invention, one or more edge devices are configured to send its data to a function (i.e. by making a remote call to perform the function remotely on another device) that sends a text message when the sensor data falls in a predefined range, for example, temperature exceeding a normal range for the environmental monitoring system. In some embodiments, the gateway could be configured to send data from a particular edge device to the function that sends the text message when the data falls in the predefined range, or when data aggregated from several edge devices matches a predefined pattern. In each case, the call to send a text message is routed through the gateway. Additional sensors (edge devices), for example, humidity sensors, each coupled to a device controller, may be added to the environmental monitoring system, and the new edge devices may have varied communication protocols. Embodiments of the invention, enable programming the new edge devices with appropriate code, and enable seamless interconnectivity with the other devices (e.g., temperature sensors) in a convenient manner by allowing simple, graphical user interface based inputs. For example, using the embodiments described herein, the new edge devices (humidity sensors) are enabled to call remote functions through the gateway seamlessly. Thus, embodiments of the invention augment the functionality of the edge and gateway devices, extending the limited capacity of the edge and gateway devices to the capacity of available remote services, while doing so in a seamless manner.

Further, according to some embodiments, one or more gateway devices in a group are programmed to operate as edge devices. In some embodiments, the group 116 includes multiple gateway devices, one or more of which may be configured to operate as an edge device, and at least one gateway device is configured to operate as an edge device. In some embodiments, the group 116 includes only multiple gateway devices, one or more of which may be configured as an edge device, and at least one gateway device is configured to operate as an edge device.

Techniques illustrated by various embodiments discussed herein make software development for a group of controller-based devices quick and easy for a user, by avoiding the need to learn complex controller programming language, and track connections and defined communication protocols. In some embodiments, the code virtualization server 114 is implemented as a service (not shown) that provides access to code generation, deployment, remote reprogramming through a web interface, or any GUI (e.g., a smartphone app or a computer application) on a user device (smartphone, computer, tablet, and the like). While the embodiments are described with respect to Internet of things (IoT) devices, those skilled in the art will readily appreciate that the techniques exemplified by the disclosed embodiments are applicable to several other programming environments.

The methods described herein may be implemented in software, hardware, or a combination thereof, in different embodiments. The methods may be embodied in computer instructions stored in a non-transitory computer readable medium, and executed by one or more processors to perform the methods. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations, and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer-implemented method for automatic generation of a program for a controller-based device in a group of controller-based devices, comprising:
   receiving, at a code virtualization server (CVS), from a user device, for a controller-based device from a plurality of controller-based devices displayed on a graphical user interface (GUI) on the user device, a selection comprising:
      a controller type of the controller-based device,
      a communication protocol to be used by the controller-based device for communicating with another controller-based device in a group of controller-based devices, the group comprising the plurality of controller-based devices, and
      a function to be performed on the CVS based on a remote call from the controller-based device to the CVS;
   automatically generating, on the CVS, a first code for execution on the controller-based device, the first code based on the controller type, the communication protocol, and the function,
   wherein the first code comprises the remote call for performing the function on the CVS, and capable of routing the remote call from the controller-based device to the CVS;
   dispatching the first code to the controller-based device for installation on the controller-based device;
   receiving the remote call from the first code installed on the controller-based device; and
   executing a second code including one or more predefined processes on the CVS based on receiving the remote call,
   wherein each of the user device, the CVS and the controller-based device is remote from each other.

2. The method of claim 1, wherein each controller-based device is either an edge device or a gateway device, and wherein the group comprises either at least one edge device and at least one gateway device, or at least two gateway devices.

3. The method of claim 2, wherein the first code routes the remote call through the at least one gateway device.

4. The method of claim 2, further comprising receiving, from the GUI, a selection of whether the controller-based device is an edge device or a gateway device, and wherein the generating the first code is further based on the selection of the edge device or the gateway device.

5. The method of claim 2 further comprising:
   receiving the remote call from the controller-based device via the at least one gateway device; and
   performing the function.

6. The method of claim 1, further comprising dispatching the first code for installation on the controller-based device directly or via the user device.

7. The method of claim 1, further comprising receiving, from the GUI, at least one parameter for performing the function, and wherein the generating the first code is further based on the at least one parameter.

8. The method of claim 1, wherein the method is repeated for all controller-based devices of the group.

9. The method of claim 1, wherein the controller type is at least one of AVR, ARM, or PIC, wherein the communication protocol comprises at least one of HTTP, HTTPS, TCP/IP, MQTT, CoAP, LoRa, ZigBee, Thread, Z-WAVE, or 6LOWPAN, and wherein the function is one of a text message, a voice call, a video call, an internal data source, or an Internet based service.

10. An apparatus for automatic software development for a group of controller-based devices, comprising:
   a processor; and
   a memory comprising executable instructions, which when executed using the processor, cause execution of a method comprising:
   receiving, at a code virtualization server (CVS), from a user device, for a controller-based device from a plurality of controller-based devices displayed on a graphical user interface (GUI) on a user device, a selection comprising:
      a controller type of the controller-based device,
      a communication protocol to be used by the controller-based device for communicating with another controller-based device in a group of controller-based devices, the group comprising the plurality of controller-based devices, and
      a function to be performed on the CVS based on a remote call from the controller-based device to the CVS,
   automatically generating, on the CVS, a first code for execution on the controller-based device, the first code based on the controller type, the communication protocol, and the function,
   wherein the first code comprises the remote call for performing the function on the CVS, and capable of routing the remote call from the controller-based device to the CVS,
   dispatching the first code to the controller-based device for installation on the controller-based device;
   receiving the remote call from the first code installed on the controller-based device, and
   executing a second code including one or more predefined processes on the CVS based on receiving the remote call,
   wherein each of the user device, the CVS and the controller-based device is remote from each other.

11. The apparatus of claim 10, wherein each controller-based device is either an edge device or a gateway device, and wherein the group comprises either at least one edge device and at least one gateway device, or at least two gateway device.

12. The apparatus of claim 11, wherein the first code routes the remote call through the at least one gateway device.

13. The apparatus of claim 11, wherein the method further comprises further comprising receiving, from the GUI, a selection of whether the controller-based device is an edge device or a gateway device, and wherein the generating the first code is further based on the selection of the edge device or the gateway device.

14. The apparatus of claim 11, wherein the method further comprises:
   receiving the remote call from the controller-based device via the at least one gateway device; and
   performing the function.

15. The apparatus of claim 10, wherein the method further comprises dispatching the first code for installation on the controller-based device directly or via the user device.

16. The apparatus of claim 10, wherein the method further comprises receiving, from the GUI, at least one parameter for performing the function, and wherein the generating the first code is further based on the at least one parameter.

17. The apparatus of claim 10, wherein the method is repeated for all controller-based devices of the group.

18. The apparatus of claim 10, wherein the controller type is at least one of AVR, ARM, or PIC, wherein the communication protocol comprises at least one of HTTP, HTTPS, TCP/IP, MQTT, CoAP, LoRa, ZigBee, Thread, Z-WAVE, or 6LOWPAN and wherein the function is one of a text message, a voice call, a video call, an internal data source, or an Internet based service.

19. A non-transitory computer readable medium for storing computer instructions that, when executed by at least one processor cause the at least one processor to perform a method for automatic generation of a program for a controller-based device in a group of controller-based devices, comprising:

displaying a plurality of controller-based devices from the group of controller-based devices on a graphical user interface (GUI) on a user device;

receiving, at a code virtualization server (CVS), from the user device, for a controller-based device from the group, a selection comprising:

a controller type of the controller-based device, a communication protocol to be used by the controller-based device for communicating with another controller-based device in the group, and a function to be performed, on the code virtualization server (CVS), based on a remote call from the controller-based device to the CVS;

automatically generating, on the CVS, a first code for execution on the controller-based device, the first code based on the controller type, the communication protocol, and the function, wherein the first code comprises the remote call for performing the function on the CVS, and capable of routing the remote call from the controller-based device to the CVS, dispatching the first code to the controller-based device for installation on the controller-based device;

receiving the remote call from the first code installed on the controller-based device; and executing a second code including one or more predefined processes on the CVS based on receiving the remote call, wherein each of the user device, the CVS and the controller-based device is remote from each other.

20. The non-transitory computer readable medium of claim 19, wherein the receiving further comprises:

receiving a selection or an input of parameters for performing the function, and sending the selection or the input to the code virtualization server.

* * * * *